Nov. 19, 1968 J. O. KELLEY 3,411,731
FLIP-FLOP SOUND TAPE CARTRIDGE
Filed Aug. 19, 1966
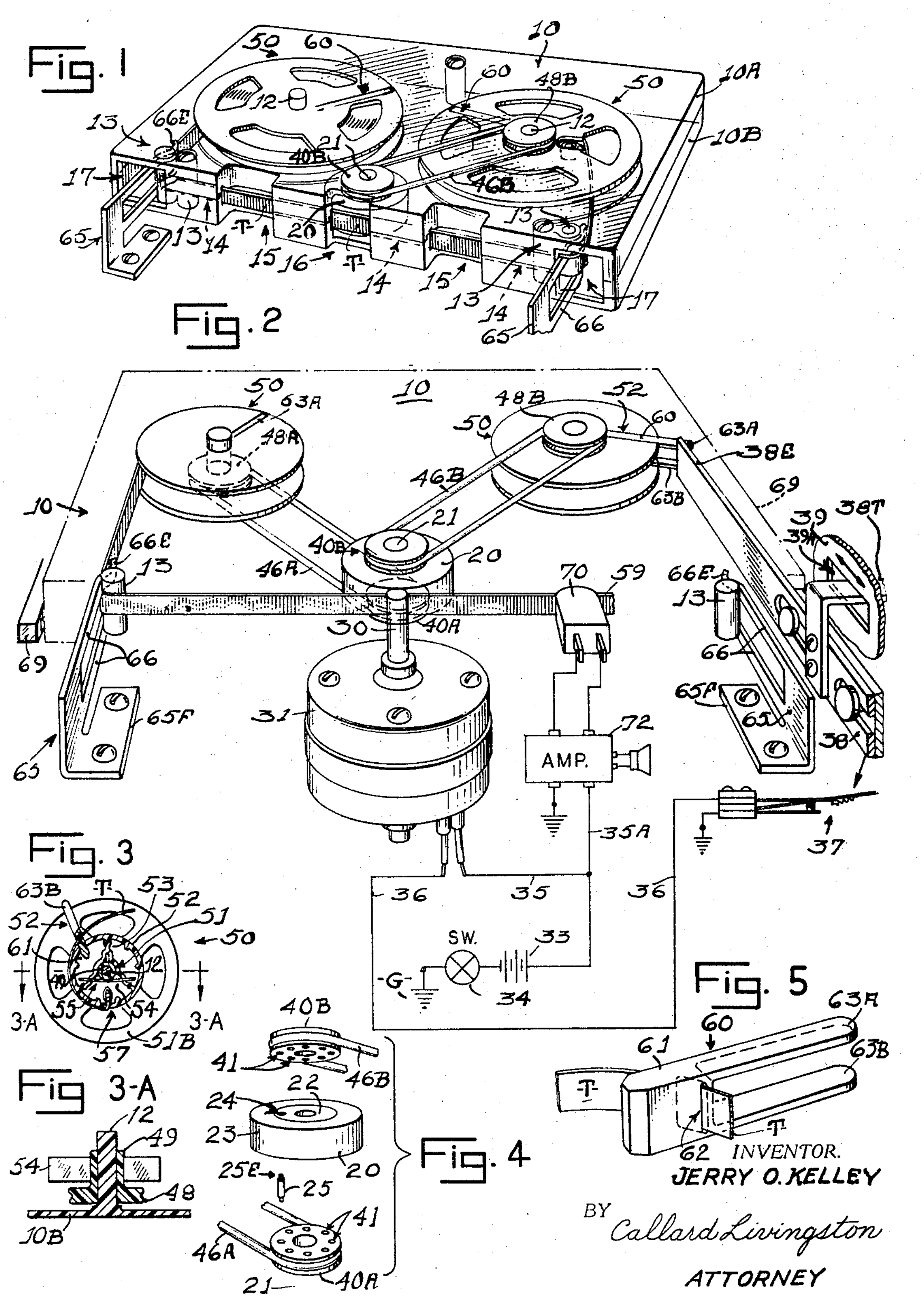
FIG. 1, FIG. 2, FIG. 3, FIG. 3-A, FIG. 4, FIG. 5
INVENTOR.
JERRY O. KELLEY
BY Callard Livingston
ATTORNEY United States Patent Office 3,411,731
Patented Nov. 19, 1968

3,411,731

FLIP-FLOP SOUND TAPE CARTRIDGE

Jerry O. Kelley, Chicago, Ill., assignor to Cart-Trac, Inc., Chicago, Ill., a corporation of Illinois Filed Aug. 19, 1966, Ser. No. 573,598
13 Claims. (Cl. 242—55.13)

ABSTRACT OF THE DISCLOSURE

A positionally sensitive clutch is provided for reel-to-reel tape cartridges adapted to be turned over on one side or the other to reverse the travel of the tape, the clutch being an integrated part of a capstan roller having a pulley at each end either of which will be coupled with the roller for positive driving therewith by a gravitationally-responsive element intercoupling the roller with only one pulley in each of the two turned-over positions of the cartridge or reel and capstan assembly.

This invention relates to sound tape apparatus and has as its principal object the provision of a reel-to-reel type of tape cartridge with built-in pinch roller means of novel reverse-drive character adapted to control the driving of the take-up reel automatically in either direction of tape travel in response to reversal of the position of the cartridge in its seat on a tape deck or other transducing means, this type of carrtidge being sometimes referred to as a "flip-flop" cartridge, it being understood that the recording tape employed in such operations has at least two sound tracks running in opposite directions, such that flipping the cartridge over on one or the other of its sides will disposed a corresponding one of the tracks in alignment with sound head.

Flip-flop cartridges are advantageous because of the simplicity of the transducing and driving apparatus which may be employed therewith, it being possible to eliminate motor-reversing relays and circuitry and effect other economies in material and assembly costs while producing a very compact transducing unit, with the result that such cartridges are favored for vehicular installations, as in automobiles, boats and the like.

The flip-flop cartridge disclosed embodies a unique automatic reverse-drive means which is contrived as part of the pinch roller and performs reel-tensioning functions which automatically apply a sensitive drag to whichever reel happens to be serving as the payout reel in the reverse direction of travel of the tape, thereby eliminating the expense of brake and other restraining means such as has been required heretofore for each reel assembly.

The foregoing and other aspects of novelty and utility inherent in the disclosure will be more particularly understood from the following description taken in view of annexed drawing, in which:

FIGURE 1 is a perspective view of the novel cartridge with parts of certain cooperative mechanism shown fragmentally therewith;

FIGURE 2 is a perspective pictorial and circuit diagram of parts of the cartridge, capstan drive and control circuit means;

FIGURE 3 is a sectional detail of one of the tape reels;

FIGURE 3–A is an enlarged sectional fragment of the hub portion of one of the tape reels as seen along lines 3–A—3–A of FIGURE 3;

FIGURE 4 is an exploded perspective detail, to enlarged scale of the novel pinch roller structure;

FIGURE 5 is an enlarged perspective detail of a part of the reversing arm of one of the tape cartridges.

As depicted in FIGURE 1, the cartridge 10 comprises a pair of molded upper and lower mating casting sections 10A and 10B, the lower section having formed as a part thereof a pair of reel spindles 12, and both sections having track-defining portions 14 for guiding the tape web T across the front of the cartridge past windows 15 for exposure to engagement with the usual sound head, the web passing over a pinch roller 20 the periphery of which protrudes through a central window 16 for engagement with a motor driven capstan spindle 30, as in FIGURE 2.

The tape T is spooled on reels 50 each of which has a hub portion 51, FIGURE 3, fitting upon the tubular shank 49 of a corresponding reel pulley 48 which in turn is rotatable upon one of the cartridge spindles 12, FIGURE 3–A.

Surrounding the hub of each tape reel is a spool wall 52 connecting with the hub by three equally spaced spokes or webs 53 in two of which are formed slots seating a blade presser spring 54 which is bowed under tension to bear against the pulley shank through a cut-away portion 55 of the hub, FIGURES 3 and 3–A, thereby frictionally coupling the reel to its pulley and affording a yieldable coupling means serving to relieve pulling stress on the tape under certain conditions, but otherwise sufficiently positive to transmit the drive of the pulley to the reel when the latter is being driven as a take-up reel, this same frictional coupling being taken advantage of in another way in the case of the reel which is acting as a payout reel, as well appear more fully hereinafter. The tape is anchored through an opening in the hub, as at 57.

The reels 50 may also be of the reverse-control type disclosed in a copending application Ser. No. 572,741, and will accordingly include a control finger 60 as shown in FIGURE 5 slidably seated in grooves in the upper and lower reel flanges 51B so as to shift along a line which is substantially parallel to a radius through the reel hub, FIGURE 3. Each control finger comprises an endwise block portion 61 containing a tape slot 62 through which the tape web T passes in a direction approximately transverse to the shifting movement of the finger. Upper and lower fingers 63A, 63B project from the block while the block portion itself is adapted to enter into the hub region of the reel through an opening in the spool wall 52 when the tape web is reeled back onto the spool, the angle of the tape slot and offset disposition of the finger seating slots in the reel flanges being such as to cause the control finger to shift inwardly and outwardly of the reel responsive to oppositely-directed pulls imparted thereto by the tape in corresponding in and out reeling actions. When the tape is being wound back onto the spool the tape slot will be disposed sufficiently close to the periphery of the spool wall to assure a smooth winding of the tape thereon.

The tape is positively driven by action of the motor capstan 30 and pinch roller 20 and in this action one of the reels must be positively driven as the take-up reel while the other must have a limited freedom of motion to serve as the payout reel but must not be permitted to overrun or spin free to spill out the tape or cause bunching. Moreover, since the effective diameter of the take-up coil or winding of tape becomes progressively greater while the diameter of the payout coil becomes correspondingly smaller, there is a differential pull of constantly changing ratio at each reel, and it is necessary to compensate automatically for these variables.

In accordance with the present disclosures, the motor capstan may always rotate in the same direction, so that no reversing controls and circuitry are required, the reversal of tape travel being achieved simply by turning the cartridge over in its seat, as a result of which that one of the pair of reels which was at the right-hand side of the capstan and served as the take-up reel becomes the payout reel at the left-hand side of the capstan as the consequence of the flip-over, and the positive drive which is to be imparted to the take-up reel is automatically achieved as a result of the change in position of the cartridge, it being important to observe that in the changed positions, the reel which is to function as the payout reel must not be positively driven.

Means for automatically coupling that one of the pair of tape reels which is to serve at a given time, or in a given one of the two positions of the cartridge, as the take-up reel, and uncoupling the remaining reel which must serve as a payout reel, comprises a positionally-sensitive and responsive clutch mechanism forming a part of a unitary pinch roller assembly indicated generally at 20 and freely rotatable on a spindle 21 which is formed integrally with the cartridge, FIGURES 1 and 2. In FIGURE 4 the unit roller 20 is seen to comprise a hub or core portion 22 which may be formed of brass, and a tire or roller portion 23 thereon formed of rubber or the like.

Disposed at a given radial distance from the axis of rotation of the pinch roller is an axially-extensive passage 24 opening through each axial end of the core and through which a coupling pin 25 having chamfered ends 25E may gravitate freely in the reverse or flopped-over positions of the cartridge.

Disposed at each of the axial ends of the pinch roller are upper and lower clutch or reel-drive pulleys 40A, 40B of identical construction and each having on that axial face thereof which confronts the roller a circular series of pin-holes 41 also spaced from the common axis of rotation of the roller and pulleys the same radial distance as the pin passage 24, so that in the assembled condition of the pinch roller structure the coupling pin 25 will drop into one of the coupling pin holes in the lowermost drive pulley in the respectively reverse operative dispositions of the cartridge, thereby positively coupling the lower pulley with the pinch roller, while the upper pulley, not thus coupled, may be said to run free except for a contrived frictional drag purposely imparted thereto by an interfacial contact between such pulley and the axial end of the pinch roller, the purpose of which will appear.

Each of the clutch or drive pulleys 40A, 40B is drivingly interconnected with a corresponding one of the reel pulleys 48A, 48B through a pulley belt 46A or 46B, and it will be apparent that since the lowermost drive pulley 40A is always positively pin-coupled with the pinch roller, the corresponding tape reel will always be positively driven to exert a pull on the tape and travel the same past the sound head 70 under tension. In this take-up action, the uppermost drive pulley exerts a pull on the payout pulley owing to the torque resulting from the permitted interfacial drag between the uppermost pulley and the corresponding axial end of the pinch roller; but it is provided that the diameters of the driving and driven reel pulleys are substantially the same, whereas the diameter of the pinch roller is greater than that of the drive pulley, so that there results a differential pull between the out-going and faster moving tape leaving the payout reel and the rotative effort imparted to the reel pulley by the drag from the corresponding drive pulley, with the ultimate result that the drag serves as a constant braking effort to prevent the payout reel from spinning or overrunning, and tension is also thus maintained on the payout portion of the tape web as it advances toward the pinch roller and capstan, it being understood that it is highly important to the performance of the device in producing good sound quality, that the tape web shall move at nearly as constant a speed as possible over the sound head.

Since reversal of the tape travel is achieved by merely turning the cartridge over, the capstan motor requires only the simplest start-stop circuitry, and the motor may be started manually and stopped automatically by the reel control finger means when the tape has run out in either direction of travel.

Referring to the circuit of FIGURE 2, any suitable power source, such as the battery 33 in the case of an automobile or boat installation, is connected through a master off-on switch 34 to a common conductor shown as ground G. The switch 34 may also control power via conductor 35A to the amplifier means 72 associated with the sound head 70. Power from one battery terminal is connected to the capstan motor via conductor 35, the circuit being completed via conductor 36 through a snap-action switch 37 returned to the common ground. Assuming the master switch means 34 to be closed, the motor may be started by manual movement of a slide 38 to cause closure of switch 37.

The free end 38E of the slide bar enters the cartridge through that one of the windows 17 which happens to be aligned therewith when the bar is shifted, as by manipulation of the finger tab 38T thereon, which will be adapted to project through an opening 39A in the wall 39 of a suitable casing housing the transducing equipment.

Such shifting of the slide bar 38 disposes said end 38E thereof in proximity to the advance of the control fingers 63A, 63B when the same shift outwardly of the reel under the pull of the tape in approaching the end of its run, and the angular disposition of the fingers and slide bar is such that the projected control fingers will push the slide bar 38 back, reopening the switch means 37 and stopping the capstan motor. At this juncture the cartridge may be flipped over and the manual slide control again actuated to repeat the process with the tape travelling in a relatively reverse direction to reproduce another sound track, the transcription or reproduction being achieved in the known manner through a suitable amplifying means 72 having an input connected to the sound head 70 over which the tape is travelled as aforesaid, as at 59.

In order to secure the cartridge releasably in operative engagement with the capstan spindle, a holding means is provided in the form of cleats 65, FIGURES 1 and 2, each comprising a foot portion 65F secured to the tape deck, and a pair of parallel spring-action prongs 66 spaced apart more than the maximum width of the tape web so as to clear the latter on posts 13, the ends 66E of said fingers being crimped to provide a detent action in springing engagement with a corresponding one of the posts 13, the prong ends entering the cartridge respectively through one of the endwise windows 17 when the cartridge is pressed to urge the pinch roller into engagement with the capstan spindle. Guide means 69 may be provided at the sides of the cartridge on the tape deck to assure proper alignment of the cartridge relative to the holding prongs and the manual control slide means 38.

I claim:

1. In sound tape apparatus of the type employing a pinch roller driven by a capstan spindle with the tape travelling therebetween and dual tape reels serving alternately as payout and takup reels, a reverse-drive pinch roller assembly having a drive pulley coaxially disposed therewith at each axial end thereof; a pair of tape reels and means rotatably mounting the same and said pinch roller in cooperative relation; driven pulley means for each said reel; belt means drivingly interconnecting each drive pulley with one of said driven reel pulleys; and positionally-responsive coupling means comprising part of said pinch roller assembly and including a positionally-shiftable member acting to positively couple only that one of said drive pulleys with the pinch roller to rotate therewith which is disposed at a lower elevation than the pinch roller in the operative disposition of the apparatus.

2. Apparatus according to claim 1 wherein said positionally-responsive means is a coupling member freely movable from and beyond one axial end to another of the pinch roller through a guideway within the roller, and each said drive pulley has coupling means disposed in a circumambient disposition about the axis of rotation thereof and exposed to the juxtaposed axial end of the roller for coupling cooperation with said coupling member when the latter projects from said guideway at least a predetermined distance beyond the appertaining end of the roller, in a predetermined position of the pinch roller, which position when reversed similarly positions said coupling member to couple the other drive pully with the pinch roller.

3. Apparatus according to claim 1 wherein said positionally-responsive means is a coupling pin and said pinch roller has a radially offset guideway formed therein in parallelism with its axis of rotation and opening into each of its axial ends; wherein said pin can gravitate freely in said guideway to project therefrom a distance beyond the axial face of the pinch roller; wherein said drive pulleys rotate coaxially with and in close proximity respectively to one of said axial faces of the roller and each pulley has in the face thereof confronting the appertaining roller face a circular series of coupling formations disposed at a radial distance from the axis of rotation thereof for coupling coaction with an end region of said pin projecting from the guideway at least a minimum amount, that one of the drive pulleys being coupled as aforesaid when it is disposed beneath the pinch roller.

4. Apparatus according to claim 1, wherein said pinch roller and tape pulleys are rotatively mounted within a cartridge with their respective axes of rotation parallel; wherein the pinch roller has peripheral drive portions exposed through a wall portion of the cartridge for driving engagement with a capstan spindle rotatable about an axis paralleling that of the roller and reels, and said coupling means acts to couple that one of the drive pulleys which is lowermost when said axes are substantially vertical and responsive to flipping the cartridge over in a 180-degree change of position so that either reel may be coupled with the pinch roller for positive drive thereby by change of position as aforesaid.

5. A construction according to claim 2 wherein said pinch roller and tape pulleys are rotatively mounted within a cartridge with their respective axes of rotation parallel; wherein the pinch roller has peripheral drive portions exposed through a wall portion of the cartridge for driving engagement with a capstan spindle rotatable about an axis paralleling that of the roller and reels, and said coupling means acts to couple that one of the drive pulleys which is lowermost when said axes are substantially vertical and responsive to flipping the cartridge over in a 180-degree change of position so that either reel may be coupled with the pinch roller for positive drive thereby by change of position as aforesaid.

6. Apparatus according to claim 3 wherein said pinch roller and tape pulleys are rotatively mounted within a cartridge with their respective axes of rotation parallel; wherein the pinch roller has peripheral drive portions exposed through a wall portion of the cartridge for driving engagement with a capstan spindle rotatable about an axis paralleling that of the roller and reels, and said coupling means acts to couple that one of the drive pulleys which is lowermost when said axes are substantially vertical and responsive to flipping the cartridge over in a 180-degree change of position so that either reel may be coupled with the pinch roller for positive drive thereby by change of position as aforesaid.

7. Apparatus according to claim 1, wherein said drive pulleys are mounted for rotation coaxially with the pinch roller as a unitary assembly in a manner such that each pulley has frictional engagement with the appertaining axial end of the roller sufficient to produce a torque on that one of the pulleys which is uppermost and not positively coupled by the coupling means as aforesaid, whereby to produce a drag torque which is transmitted to the appertaining reel pulley, said drive and reel pulleys being of substantially similar diameter and the pinch roller having a diameter greater than that of either pulley whereby the drag torque exerts a braking effect on that one of the tape reels which is not positively driven from the pinch roller for the purpose of producing a tension on the tape payed out from said last-mentioned reel.

8. Apparatus according to claim 2 wherein said drive pulleys are mounted for rotation coaxially with the pinch roller as a unitary assembly in a manner such that each pulley has frictional engagement with the appertaining axial end of the roller sufficient to produce a torque on that one of the pulleys which is uppermost and not positively coupled by the coupling means as aforesaid, whereby to produce a drag torque which is transmitted to the appertaining reel pulley, said drive and reel pulleys being of substantially similar diameter and the pinch roller having a diameter greater than that of either pulley whereby the drag torque exerts a braking effect on that one of the tape reels which is not positively driven from the pinch roller for the purpose of producing a tension on the tape payed out from said last-mentioned reel.

9. Apparatus according to claim 3 wherein said drive pulleys are mounted for rotation coaxially with the pinch roller as a unitary assembly in a manner such that each pulley has frictional engagement with the appertaining axial end of the roller sufficient to produce a torque on that one of the pulleys which is uppermost and not positively coupled by the coupling means as aforesaid, whereby to produce a drag torque which is transmitted to the appertaining reel pulley, said drive and reel pulleys being of substantially similar diameter and the pinch roller having a diameter greater than that of either pulley whereby the drag torque exerts a braking effect on that one of the tape reels which is not positively driven from the pinch roller for the purpose of producing a tension on the tape payed out from said last-mentioned reel.

10. Apparatus according to claim 1 wherein said pinch roller assembly and tape reels are contained within a cartridge case adapted to be disposed on opposite sides for reverse tape travel in one of two opposite operative positions relative to said capstan spindle, said reels and pinch roller assembly being mounted in said case to rotate about parallel axes, a peripheral drive portion of the pinch roller being exposed through a sidewall portion of the cartridge case with the tape web travelling from one reel to the other over the externally exposed portion of the pinch roller, wherein means is provided for confining movement of said positionally-shiftable member within said assembly in a direction mainly parallel to the axis of rotation of the pinch roller and at a certain radial distance from said axis; wherein each said drive pulley has a series of coupling formations in the face thereof confronting the pinch roller and spaced apart circumambiently of said axis and each lying at said radial distance to be drivingly engaged by said shiftable member responsive to a positioning of the cartridge with said axes substantially vertical, such that one or the other of said drive pulleys is positively drivingly coupled to the pinch roller by gravitating action of said shiftable member into engagement with one of said coupling formations in response to disposition of the cartridge in one of said opposite operative positions thereof.

11. Apparatus according to claim 10 wherein said drive pulleys each have a frictional impositive drive coupling with the pinch roller such that one of said pulleys which is not positively coupled with the pinch roller during rotation of the latter by the capstan spindle has a torque imparted thereto by said impositive drive coupling, said torque being communicated to the appertaining reel as a substantially constant braking force restraining free payout rotation of such reel sufficiently to maintain a yielding tautness on the payout web of the tape being wound onto the other reel which is being positively driven by the pinch roller as a takeup reel.

12. In sound tape apparatus, a flip-flop type of tape cartridge comprising a cartridge casing adapted to occupy either of two reverse operating positions relative to a capstan spindle, a pair of tape reels and a pinch roller assembly rotatably mounted within the casing and means exposing peripheral portions of the pinch roller for driving engagement with said capstan spindle, the tape web passing from one reel to the other over said peripheral portions of the pinch roller in rotation of the latter whereby the tape will be positively unwound from one of the reels for takeup transfer to the other reel, and means for positively driving that one of the reels which is serving as the takeup reel in each of said two reverse operating positions of the cartridge casing, said means comprising the provision of two drive pulleys one at each of the opposite axial ends of the pinch roller to rotate coaxially thereof, coupling formations at both axial ends of the pinch roller and at the confronting sides of each said drive pulleys, and a movable coupling member disposed to drivingly intercouple said formations with a different one of said drive pulleys in each of said operating positions of the cartridge casing, the drive pulley which is coupled as aforesaid being that one which is to drive the appertaining reel as a takeup reel.

13. A sound tape cartridge for flip-flop operation in either of two opposite turned-over operating positions 180 degrees apart in cooperative relation to a capstan spindle, said cartridge including a casing, a pair of tape reels rotatably mounted within the casing with peripheral portions exposed for driving engagement by a capstan spindle in either of the said operating positions, the tape web passing in payout and takeup travel from one reel to the other over the exposed portions of the pinch roller to run in one or the other direction depending upon the relative direction of rotation of the pinch roller by the capstan spindle in said opposite operating positions of the cartridge; drive pulley means disposed at each axial end of the pinch roller and captured on a common rotative axis therewith as part of said assembly, each said pulley means having driving interconnection with one of said reels to rotate the latter; and movable gravity-responsive coupling means contained within said assembly and acting in each of said two operating positions of the cartridge to positively couple a different one of said drive pulleys with the pinch roller in each of said two operating positions of the cartridge; together with means for imparting to that one of the drive pulleys which is not positively coupled as aforesaid a yieldable frictional coupling affording a substantially constant drag on the appertaining reel from which the tape is unwound in payout action to impart a tension to the payout portion of the tape web.

References Cited

UNITED STATES PATENTS

| | | | |
|---|---|---|---|
| 2,987,956 | 6/1961 | Planert et al. | 242—55.13 X |
| 3,348,786 | 10/1967 | Miller et al. | 242—55.13 |

LEONARD D. CHRISTIAN, *Primary Examiner.*